S. F. PARKER.
BEET TOPPER.
APPLICATION FILED OCT. 8, 1917.
1,275,298.
Patented Aug. 13, 1918.
2 SHEETS—SHEET 1.
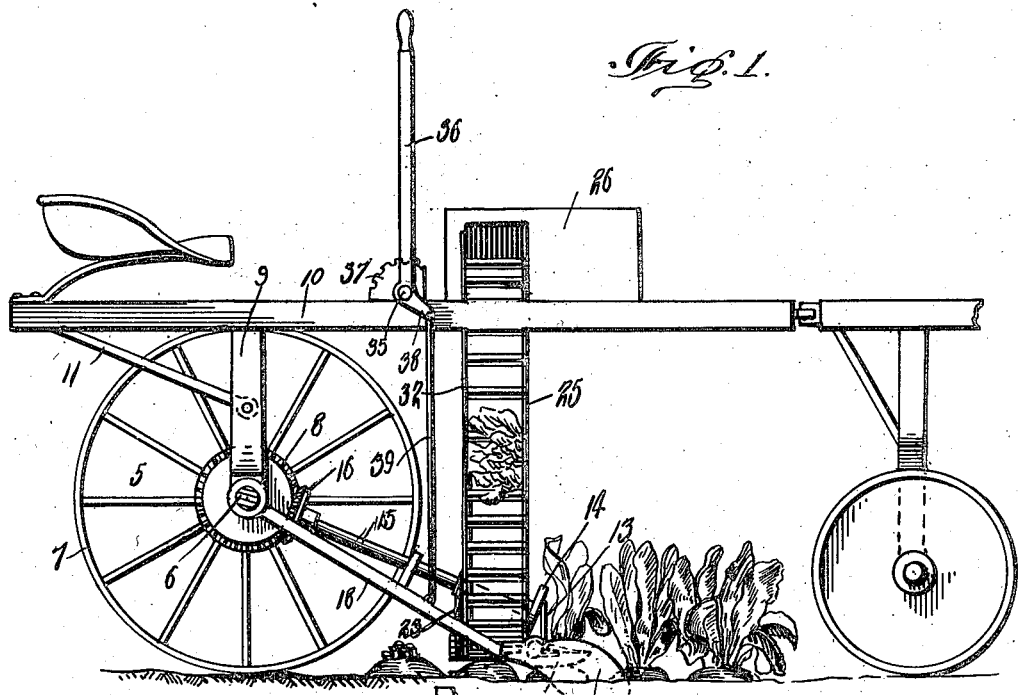
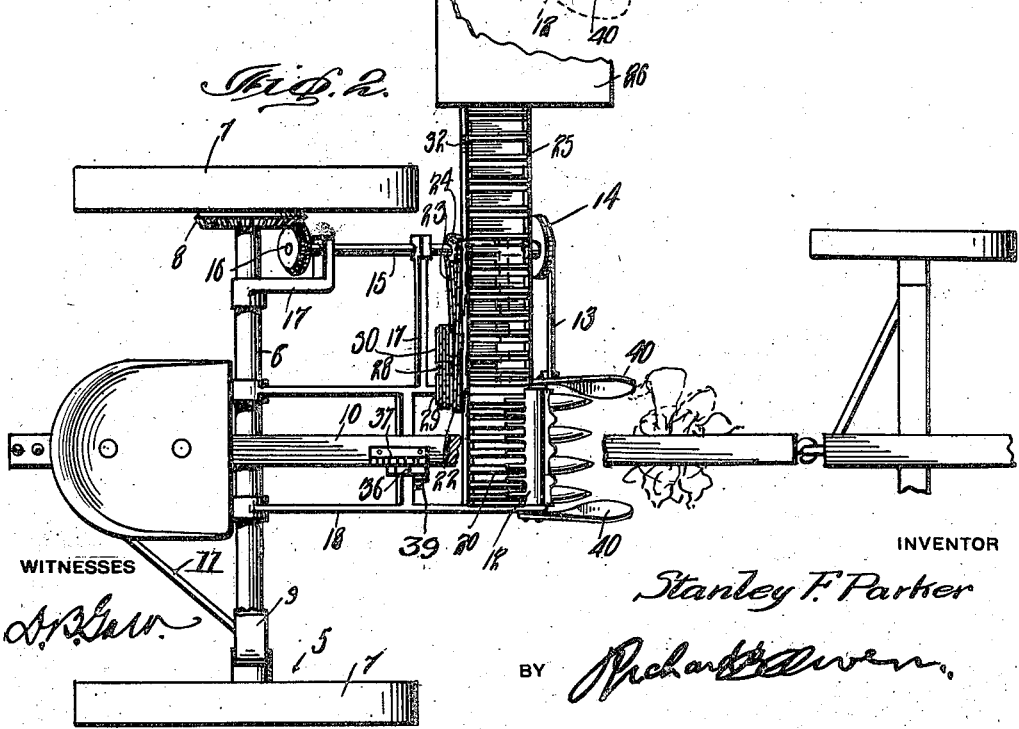

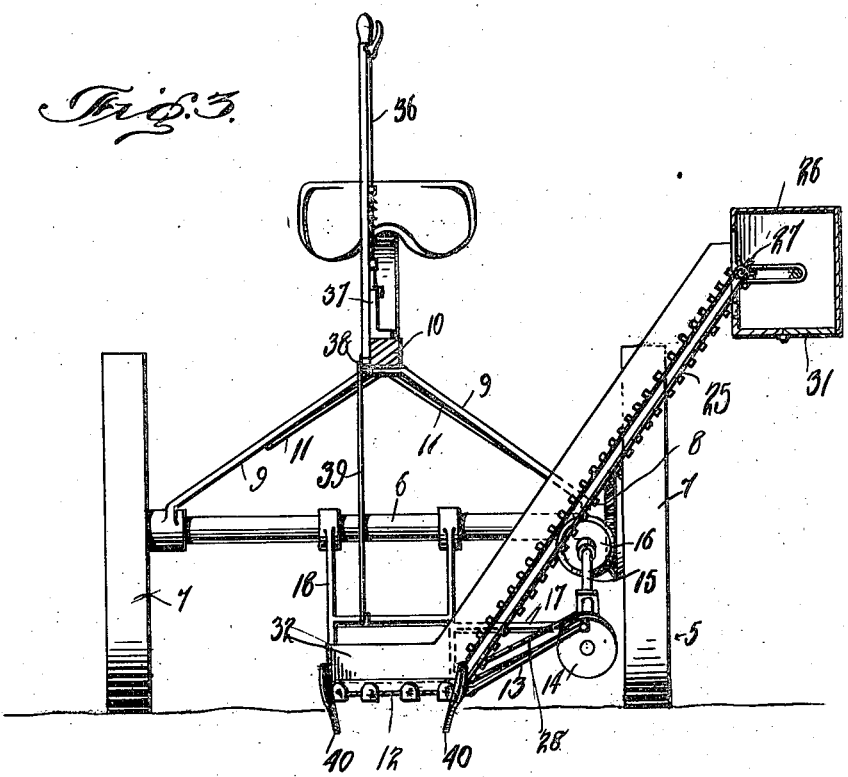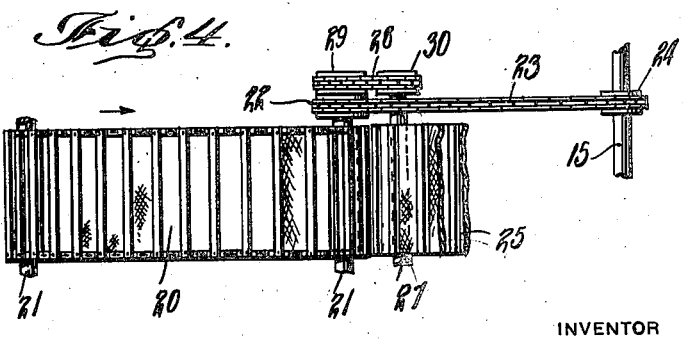

UNITED STATES PATENT OFFICE.

STANLEY F. PARKER, OF MILWAUKEE, WISCONSIN.

BEET-TOPPER.

1,275,298.

Specification of Letters Patent.   Patented Aug. 13, 1918.

Application filed October 8, 1917.   Serial No. 195,382.

*To all whom it may concern:*

Be it known that I, STANLEY F. PARKER, a citizen of the United States, residing at Milwaukee, in the county of Milwaukee and State of Wisconsin, have invented certain new and useful Improvements in Beet-Toppers, of which the following is a specification.

This invention relates to harvesting machines, and particularly to beet harvesters, the object of the invention primarily being to generally simplify and improve the operation and construction of devices of this character, as well as to increase the efficiency of the same.

A further object of the invention is to provide a topping mechanism for use in connection with machines for harvesting the beets, and which may be readily applied to the harvesting machine in advance of the digging or gathering elements thereof.

Still further objects reside in providing a topping machine of the character mentioned which shall be of extremely simple and inexpensive construction, which is composed of but few simple and readily assembled parts, the various parts being so constructed and assembled as to minimize the opportunity for wear, breakage, or derangement, which is easy and positive of operation, which facilitates the digging operation of the beets and which will prove thoroughly efficient and practical in its operation.

With these objects in view together with others which will appear as the description proceeds, the invention resides in the novel formation, combination and arrangement of parts, all as will be described more fully hereinafter, illustrated in the drawings and particularly pointed out in the claim.

In the drawings:

Figure 1 is a side elevation of a topping machine constructed in accordance with the invention, the view illustrating the topper applied to the draft pole of a harvesting machine, Fig. 2 is a top plan view of the machine illustrated in Fig. 1, Fig. 3 is a front elevation, parts being broken away, of the improved topping machine, and Fig. 4 is a detail plan view on a slightly enlarged scale, illustrating the conveyers for carrying the tops after the latter have been severed from the growing beets.

In carrying out the invention, a truck indicated at 5 is provided, the said truck affording supporting means for the cutting mechanism. The truck comprises an axle 6 and a pair of wheels 7, one of which is provided with a gear 8 for driving the cutter to be hereafter detailed. This axle has attached thereto a bracket 9, by means of which the axle may be supported from a beam 10, and rearwardly extending arms 11 connect the bracket 9 with the beam and assist in firmly securing the bracket to the beam.

The topping mechanism comprises a cutter indicated generally at 12, the said cutter being of relatively short length, and being of that type wherein a reciprocating knife is employed, the said knife being driven by the pitman secured on one end to a rotating disk 14, the latter being carried by a shaft 15 extending forwardly from the truck frame. This shaft carries at its rear end a beveled gear 16, which is in mesh with the beveled gear 8 upon the ground engaging frame. Suitable arms 17 support the shaft 15, as shown particularly in Fig. 2 of the drawings. The cutting mechanism is supported at the forward end on the arms of a bracket 18 rotatably mounted at its rear end upon the axle 6 of the truck, and it is obvious that this construction permits of the raising and lowering of the cutting mechanism.

Arranged in the rear of the cutting mechanism so as to travel in a direction parallel to the axle 6, is a conveyer 20. This conveyer travels over the spaced longitudinally disposed shafts 21, to one of which a sprocket 22 is secured, and over which a sprocket chain 23 passes. This sprocket chain also travels over a sprocket 24 secured to the forwardly projecting shaft 15, and it is obvious that as the vehicle advances, and as the cutting mechanism is operated, the conveyer will be moved in the direction indicated by the arrow on Fig. 4. An angularly inclined conveyer 25 communicates with the conveyer 20 at one end thereof, and this conveyer 25 is adapted to receive the tops cut from the growing beets to carry them upwardly and deposit the same in a box or other suitable receptacle 26 at one side of the truck. The conveyer 25 travels over suitable drums secured to the supporting shaft 27, and a sprocket chain 28 connects the sprockets 29 and 30 on the shafts 21 and 27, respectively, whereby power will be transmitted to the last mentioned of these shafts from the shaft 21. The receptacle 26 is provided in its bottom with a door 31, so that the contents thereof may be emptied when desired. A shield 32 is arranged at the rear of the conveyer 20, and also extends upwardly at the rear side of the angularly disposed conveyer 25, so that the beet tops cannot become jostled or blown from the conveyers when being carried to the receptacle 26. This shield 32 is suitably secured at its lower end to the supporting frame for the cutter mechanism, and carries the receptacle 26 at its other end.

Pivoted as at 35 upon the beam 10 is a hand-operated lever 36, the said lever traveling around a segment indicated at 37. This lever has an angularly disposed foot to which one end of a link 39 is connected, the opposite end of the link being connected to one of the forwardly projecting arms supporting the cutting mechanism. It is obvious, therefore, that adjustments may be made in the cutter mechanism so as to compensate for the foliage of the growing plants with which the machine may be used. When it is desired, the lever may be swung all the way back, so that the cutting mechanism may be lifted entirely clear of the ground.

Associated with the cutting means is a mechanism for facilitating the harvesting of the beets after the topping operation. This mechanism comprises a pair of guards 40, the said guards comprising plates or shields which are adapted to dig into the ground one upon each side of the beet rows, so that as the machine advances, the earth surrounding the beets will be moved away from the same. These guards also prevent the severed tops from falling outwardly beyond the sides of the horizontally disposed conveyers, thereby assuring the proper delivery of the tops to the conveyers. It will be observed, particularly with reference to Fig. 1 of the drawings, that the shields or shoes 40 extend outwardly from their lower to their upper ends, so that the earth will be properly thrown to one side.

It is obvious from this description that I have provided topping means which may be used with or without a gatherer or harvesting machine. As the machine advances, the tops are severed from the beets and conveyed to the receptacle, and when filled, the latter is opened so that the contents are deposited in a pile upon the ground. The provision of the shoes 40 at the ends of the cutter bar, causes the beets being partially exposed to view, and by removing the dirt in this manner, the harvesting of the beets is greatly facilitated.

While the present is a disclosure of the preferred embodiment of the invention, it is to be understood that the invention is not limited thereto, as various changes in the minor details of construction, proportion and arrangement of parts may be resorted to if desired without departing from the spirit of the invention as defined by the appended claim.

What is claimed is:

In a beet topping machine, a truck including an axle, a bracket hinged at one end upon said axle and capable of swinging vertically, a cutter carried at the free end of said bracket and adjacent one side thereof, a conveyer supported by said bracket in the rear of said cutter and being disposed transversely of the said bracket, a shaft rotatably supported by said bracket at one side thereof, intermeshing bevel gears on the said shaft and axle, driving connections between the said shaft and cutter and between the said shaft and conveyer, and means for raising and lowering said bracket.

In testimony whereof I affix my signature in presence of two witnesses.

STANLEY F. PARKER.

Witnesses:
   Jos. BIELAUSKI,
   R. F. WOLFE.